US009286296B2

(12) United States Patent
Lee

(10) Patent No.: US 9,286,296 B2
(45) Date of Patent: Mar. 15, 2016

(54) MOBILE TERMINAL AND METHOD OF CONTROLLING THE SAME

(75) Inventor: Kyeongjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 13/156,546

(22) Filed: Jun. 9, 2011

(65) Prior Publication Data

US 2012/0003966 A1 Jan. 5, 2012

(30) Foreign Application Priority Data

Jul. 1, 2010 (KR) ........................ 10-2010-0063315

(51) Int. Cl.
G06F 15/16 (2006.01)
G06F 17/30 (2006.01)

(52) U.S. Cl.
CPC .... *G06F 17/30053* (2013.01); *G06F 17/30867* (2013.01)

(58) Field of Classification Search
None
See application file for complete search history.

(56) References Cited

U.S. PATENT DOCUMENTS

| 7,260,564 | B1 | 8/2007 | Lynn et al. |
| 8,417,575 | B2* | 4/2013 | Nakajima et al. ............ 705/26.1 |
| 2001/0003828 | A1* | 6/2001 | Peterson ........... G06F 17/30867 709/219 |
| 2001/0018858 | A1* | 9/2001 | Dwek ............................. 84/609 |
| 2002/0032019 | A1* | 3/2002 | Marks et al. .................. 455/414 |
| 2004/0088328 | A1 | 5/2004 | Cook et al. |
| 2004/0250205 | A1* | 12/2004 | Conning ....................... 715/517 |
| 2006/0031551 | A1* | 2/2006 | Agresta et al. ............... 709/231 |
| 2006/0265409 | A1* | 11/2006 | Neumann et al. ............ 707/100 |
| 2007/0265073 | A1* | 11/2007 | Novi et al. ...................... 463/35 |
| 2008/0270903 | A1* | 10/2008 | Trahan et al. ................. 715/716 |
| 2009/0099911 | A1* | 4/2009 | Ota ................................. 705/14 |
| 2009/0222716 | A1* | 9/2009 | Boerries et al. .............. 715/206 |
| 2010/0162115 | A1 | 6/2010 | Ringewald et al. |
| 2010/0185748 | A1* | 7/2010 | Ishii et al. .................... 709/219 |

FOREIGN PATENT DOCUMENTS

| CN | 1809796 A | 7/2006 |
| CN | 101268460 A | 9/2008 |
| CN | 101588408 A | 11/2009 |

OTHER PUBLICATIONS

European Search Report issued in Appln No. 11172173.4-1225 dated Oct. 7, 2011.
Chinese Office Action dated Jun. 6, 2013.

* cited by examiner

Primary Examiner — Ryan Jakovac
(74) Attorney, Agent, or Firm — Ked & Associates, LLP

(57) ABSTRACT

Disclosed herein are a mobile terminal and a method of controlling the mobile terminal. The mobile terminal may include a radio communication interface, a storage device configured to store a content playlist, and a controller configured to update the content playlist. The controller may acquire content information corresponding at least one streaming content from on a web page accessed through the radio communication unit interface. The content information may include address information for retrieving the at least one streaming content. The controller may update the content play list to include the at least one streaming content based on the acquired content information.

14 Claims, 14 Drawing Sheets

FIG. 3

```
....
<P class="view" style="FONT-SIZE: 10pt;" align=center></P>
<DIV class="view" style="FONT-SIZE: 10pt;" align=center>

<EMBED autostart="true" invokeURLs="false"
EnableContextMenu="false"
WIDTH: 300px; TOP: 557px; HEIGHT: 45px"
src=http://20090913_42_blogfile/Music 1.wma
width=300 height=45 type=application/octet-stream>

</DIV>
<P class="view" style="FONT-SIZE: 10pt; align=center> </P>
<P class="view" style="FONT-SIZE: 10pt; align=center> </P>
....
```

FIG. 13A

| Title | Artist | Genre | User Rating | The number of times of play |
|---|---|---|---|---|
| Music 1 | Artist A | Ballad | 3 | 4 |
| Music 2 | Artist B | Ballad | 4 | 3 |
| Music 3 | Artist B | Ballad | 4 | 2 |
| Music 4 | Artist B | Dance | 3 | 2 |

FIG. 13B

| | The frequency of words | Rating marks | The number of times of play |
|---|---|---|---|
| AAA | 1 | 3 | 4 |
| BBB | 2 | 3+4 | 4+2 |
| CCC | 3 | 3+4+4 | 4+3+2 |
| DDD | 1 | 4 | 3 |
| EEE | 1 | 4 | 3 |
| FFF | 1 | 4 | 2 |
| GGG | 1 | 3 | 2 |
| HHH | 1 | 3 | 4 |

FIG. 13C

| | The frequency of words | Rating marks | The number of times of play | Last marks |
|---|---|---|---|---|
| AAA | 1 | 3 | 4 | 0.1 |
| BBB | 2 | 3+4 | 4+2 | 0.4 |
| CCC | 3 | 3+4+4 | 4+3+2 | 0.6 |
| DDD | 1 | 4 | 3 | 0.2 |
| EEE | 1 | 4 | 3 | 0.25 |
| FFF | 1 | 4 | 2 | 0.3 |
| GGG | 1 | 3 | 2 | 0.12 |
| HHH | 1 | 3 | 4 | 0.2 |

MOBILE TERMINAL AND METHOD OF CONTROLLING THE SAME

CROSS-REFERENCE TO RELATED APPLICATION(S)

This application claims priority under 35 U.S.C. §119 to Korean Application No. 10-2010-0063315 filed in Korea on Jul. 1, 2010, whose entire disclosure(s) is/are hereby incorporated by reference.

BACKGROUND

1. Field

A mobile terminal and a method of controlling the same are disclosed herein.

2. Background

Mobile terminals and methods of controlling the same are known. However, they suffer from various disadvantages.

BRIEF DESCRIPTION OF THE DRAWINGS

The embodiments will be described in detail with reference to the following drawings in which like reference numerals refer to like elements wherein:

FIG. 3 is a diagram showing an example of content information included in the source file of a web page in the mobile terminal according to the first exemplary embodiment of this document;

FIGS. 13A and 13C are diagrams showing an example in which keywords are extracted in the mobile terminal according to a second exemplary embodiment of this document.

DETAILED DESCRIPTION

The present disclosure will now be described more fully with reference to the accompanying drawings, in which exemplary embodiments of the disclosure are shown. The disclosure may, however, be embodied in many different forms and should not be construed as being limited to the embodiments set forth herein; rather, there embodiments are provided so that this disclosure will be thorough and complete, and will fully convey the concept of the disclosure to those skilled in the art.

Hereinafter, a mobile terminal relating to the present disclosure will be described below in more detail with reference to the accompanying drawings. In the following description, suffixes "module" and "unit" are given to components of the mobile terminal in consideration of only facilitation of description and do not have meanings or functions discriminated from each other.

Terminals can be divided into mobile terminals and stationary terminals. The mobile terminals can be classified into handheld terminals and vehicle mount terminals according to whether users can personally carry the terminals.

Recently, with the diversity of services provided by mobile terminals, the improvement of structural parts or software parts or both of the mobile terminals is being taken into consideration.

This document relates to a mobile terminal and a method of controlling the mobile terminal and to a mobile terminal and a method of controlling the mobile terminal, which are capable of adding streaming contents to the content playlist of the mobile terminal on the basis of content information acquired by the parsing of a web page.

The mobile terminal described in the specification can include a cellular phone, a smart phone, a laptop computer, a digital broadcasting terminal, personal digital assistants (PDA), a portable multimedia player (PMP), a navigation system and so on.

However, those skilled in the art will easily understand that configurations according to embodiments of the present disclosure can also be applied to stationary terminals such as digital TV and desktop computers except a case where the configurations can be applied to only mobile terminals.

Figure 1:
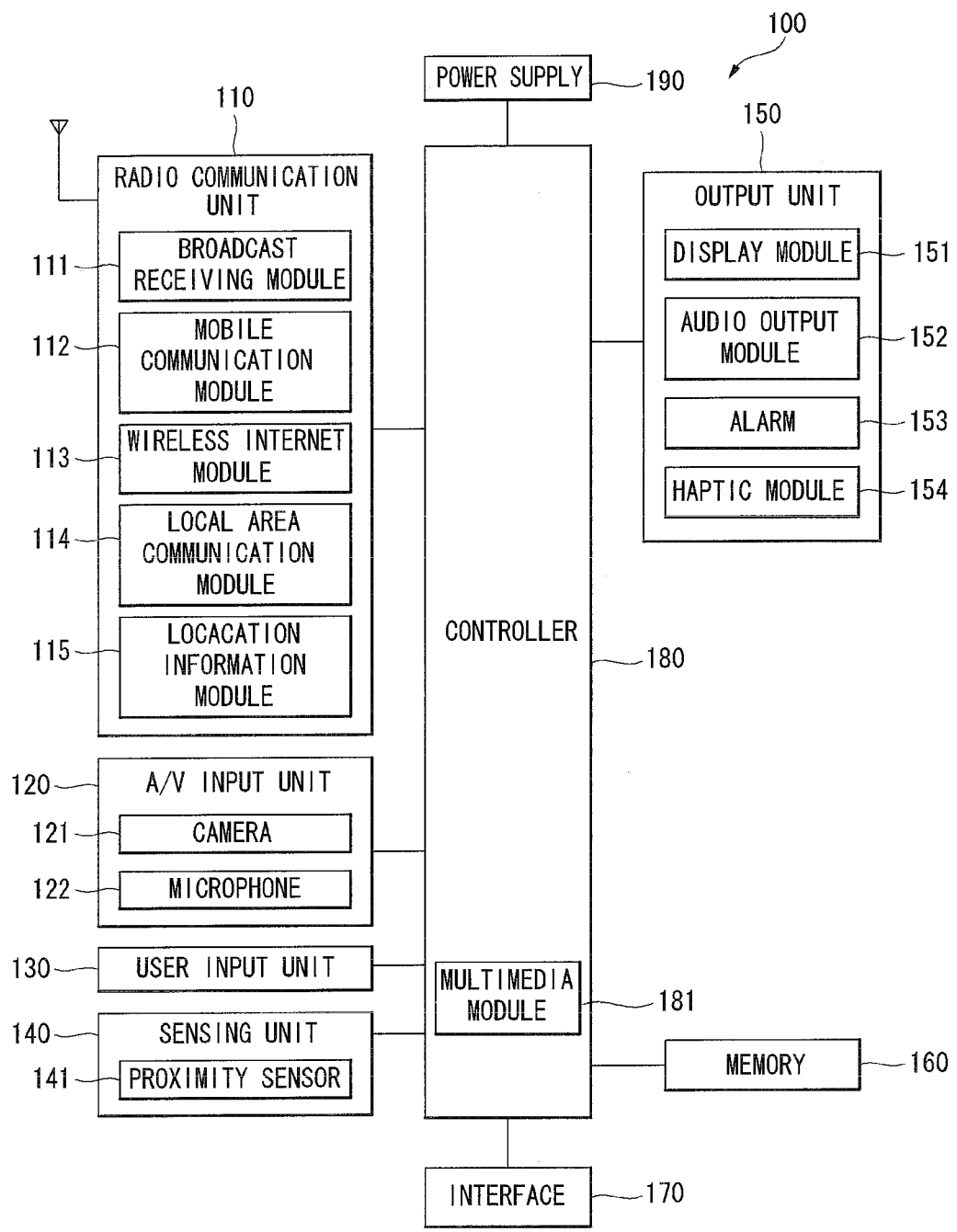
FIG. 1 is a block diagram of a mobile terminal according to an example embodiment.
Figure 2:
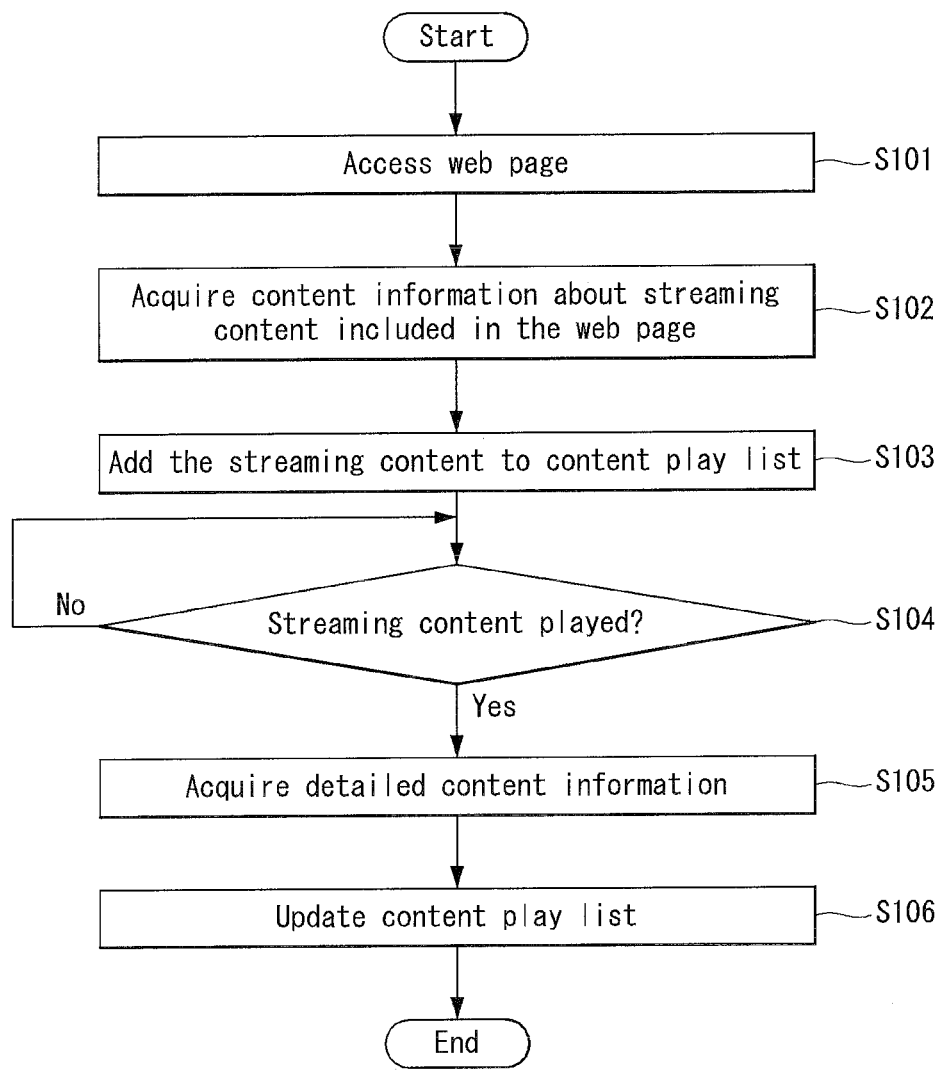
FIG. 2 is a flowchart illustrating a method of adding a streaming content to a content playlist in the mobile terminal according to a first exemplary embodiment of this document.

FIG. 1 is a block diagram of a mobile terminal 100 according to example embodiments. Other embodiments, configurations and arrangements may also be provided. As shown, a mobile terminal 100 may include a radio communication unit 110 (wireless communication interface), an audio/video (A/V) input unit 120, a user input unit 130, a sensing unit 140, an output unit 150, a memory 160, an interface 170, a controller 180 and a power supply 190. The components shown in FIG. 2 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photoelectric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 may be one of a various type of storage device and may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present disclosure can be implemented in a computer or similar device readable recording medium using software, hardware or a combination thereof, for example.

According to hardware implementation, the embodiments of the present disclosure can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Embodiments disclosed in this document may be implemented in the mobile terminal 100 described with reference to FIG. 1.

Hereinafter, a method of controlling the mobile terminal 100 according to a first exemplary embodiment of this document and the operations of the mobile terminal 100 for implementing the method are described in detail with reference to FIGS. 2 to 11.

FIG. 2 is a flowchart illustrating a method of adding a streaming content to a content playlist in the mobile terminal 100 according to the first exemplary embodiment of this document. FIGS. 3 to 7 are diagrams illustrating the method of adding a streaming content to the content playlist in the mobile terminal 100 according to the first exemplary embodiment of this document.

Referring to FIG. 2, the controller 180 accesses a web page through the radio communication unit 110, at step S101. The controller 180 acquires content information, comprising path information about a streaming content, from the web page and stores the acquired content information in the memory 160, at step S102. The streaming content may be content that can be downloaded from the web page and played. The streaming content may be content that is played back while the content is being downloaded. The streaming content may be a live broadcast that is streamed over a network in real-time or a stored, on-demand type content which is streamed to the user when requested. Moreover, the streamed content may be buffered to reduce interruptions during playback. In order to conserve resources on the terminal, the streamed content may be discarded after playback, e.g., only the buffered video is temporarily saved. In certain embodiments, however, the streamed content may be stored on the local memory 160 on the terminal.

Streaming content may include audio content, video content, multimedia content, and the like. The path information comprises a web address, such as a uniform resource language (URL), and may comprise the address of a web server where the streaming content is placed or the address of the web page where the streaming content is placed.

The controller 180 parses the source file of the web page received through the radio communication unit 110 in order to acquire the content information from the web page. That is, the controller 180 extracts codes pertinent to the streaming content by parsing the source file. Next, the controller 180 acquires the content information by analyzing the extracted codes.

FIG. 3 is a diagram showing an example of content information included in the source file of a web page. Referring to FIG. 3, the source file of the web page consists of hyper text markup language (HTML) codes 3. In the HTML codes, an embedded tag 3a comprises content information, such as a URL (http://20090913_42_blogfile/AAA.wma), indicating the location of a streaming content included in the corresponding web page, and a streaming content title (AAA.wma). The controller 180 can acquire the content information about the streaming content by analyzing the embedded tag extracted from the source file of the web page.

FIG. 3 shows an example of the source file of a web page. The source file of the web page may be implemented in another form. For example, the source file may be written in codes other than the HTML codes. For example, the content information about the streaming content included in the web page may be written so that it is included in codes other than the embedded tag. For example, the content information about the streaming content included in the web page may also be changed.

Referring back to FIG. 2, the controller 180 adds the streaming content to the content playlist stored in the memory 160 on the basis of the content information acquired from the web page, at step S103.

Figure 4A:
FIGS. 4A to 4C are diagrams showing an example in which a streaming content is added to the content playlist in the mobile terminal according to the first exemplary embodiment of this document.
Figure 4B:
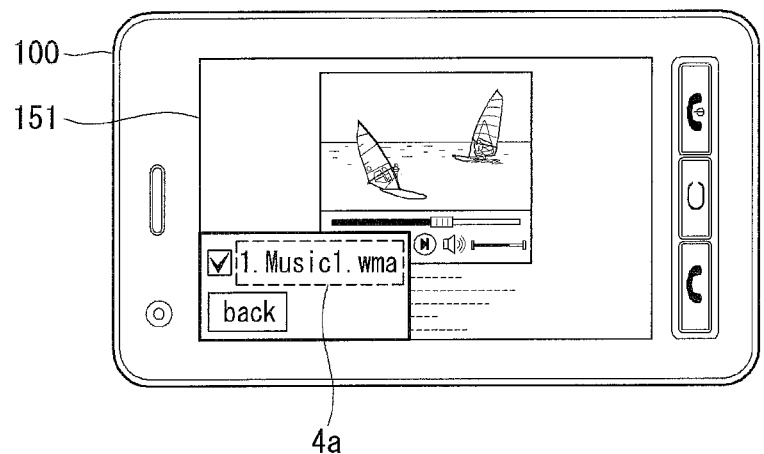
Figure 4C:
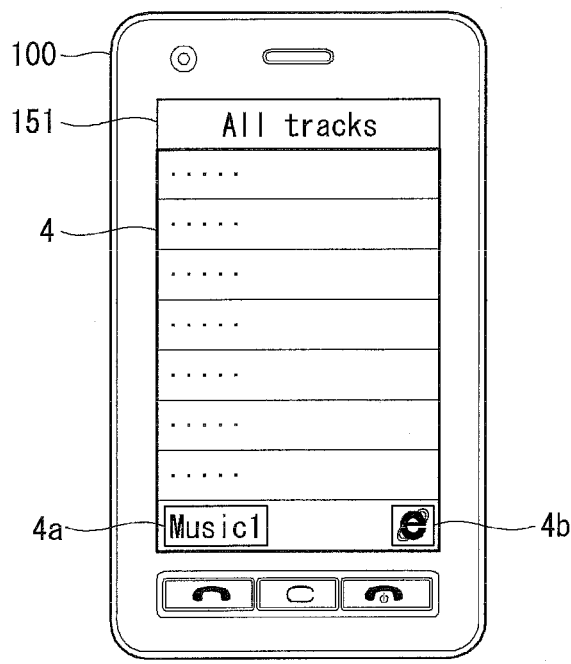

FIGS. 4A to 4C are diagrams showing an example in which a streaming content is added to the content playlist.

Referring to FIG. 4A, the controller 180 which has accessed the web page through the radio communication unit 110 receives a request that the streaming content included in the corresponding web page should be added to the content playlist of the mobile terminal 100 through the user input unit 130. The request may be a request to update an existing playlist or a request to generate a new playlist. In response to the request to update or create a playlist, the controller 180 acquires the content information included in the web page by parsing the web page. The controller 180 displays a streaming content object 4a included in the web page on the basis of the acquired content information, as shown if FIG. 4B. The streaming content object 4a may be an icon, a hyperlink, or another appropriate type of object which may represent the streaming content. When a request that the streaming content 4a should be added to the content playlist of the mobile terminal 100 (or a new playlist created) is received, the controller 180 adds the streaming content object 4a to the content playlist 4 of the memory 160, as shown in FIG. 4C. In case where the content playlist 4 is displayed on a screen, the controller 180 displays an icon 4b indicating that the streaming content 4a included in the content playlist 4 is for a streaming content. The URL (Uniform Resource Locator) of a web page where the streaming content 4a is located or of a web page from which the information about the streaming content 4a can be acquired may be mapped to the icon 4b. Accordingly, a user can select the icon 4b and easily acquire the information about the streaming content 4a.

FIGS. 4A to 4C show an example in which a streaming content included in the web page is added to the content playlist. The mobile terminal 100 may add a plurality of streaming contents included in a web page to the content playlist of the mobile terminal 100 at the same time.

Figure 5A:
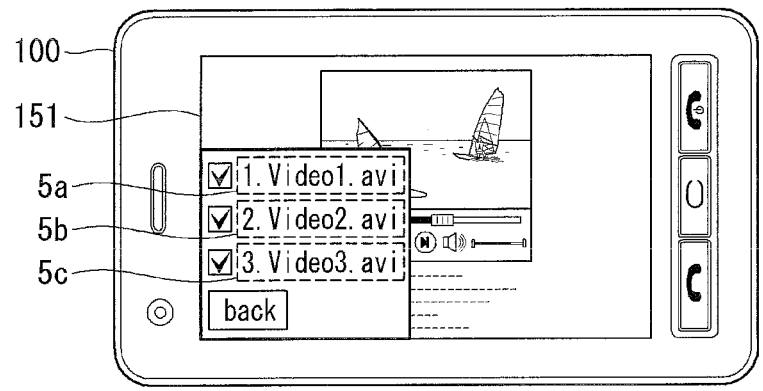
FIGS. 5A and 5B are diagrams showing an example in which a plurality of streaming contents is added to the content playlist in the mobile terminal according to the first exemplary embodiment of this document.
Figure 5B:
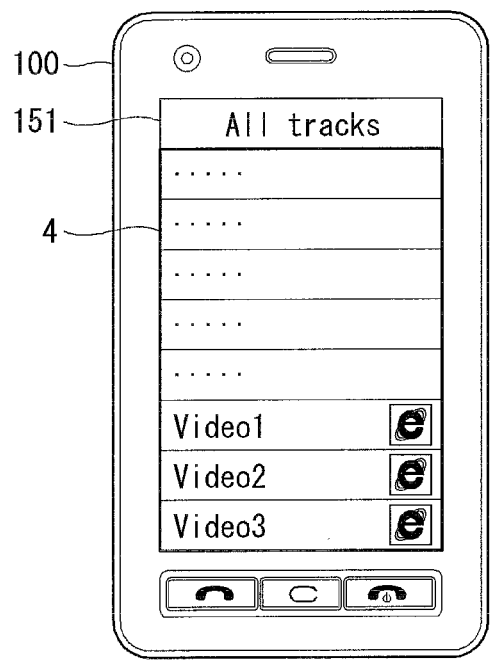

FIGS. 5A and 5B are diagrams showing an example in which a plurality of streaming contents is added to the content playlist.

Referring to FIGS. 5A and 5B, the controller 180 accesses a web page, including a plurality of streaming contents, through the radio communication unit 110. Next, the controller 180 parses the web page and displays a list of a plurality of streaming contents 5a, 5b, and 5c, corresponding to streaming contents and included in the web page, on a screen. When a user selects the streaming contents 5a, 5b, and 5c to be added to the content playlist, as shown in FIG. 5A, the controller 180 adds the selected streaming contents 5a, 5b, and 5c to the content playlist 4 of the mobile terminal 100, as shown in FIG. 5B.

Meanwhile, in case where a streaming content is registered as the background music of a web page, the mobile terminal 100 may add the registered streaming content to the content playlist as a background music mode according to a user selection. In this case, when the background music of the corresponding web page is selected, the controller 180 may update the content playlist based on the added streaming content. That is, the controller 180 may add the changed or new streaming content to the content playlist instead of the previous streaming content existing before the change to a new streaming content. The streaming content in a background music mode is described in further detail with reference to FIGS. 6A and 6B, hereinbelow.

Figure 6A:
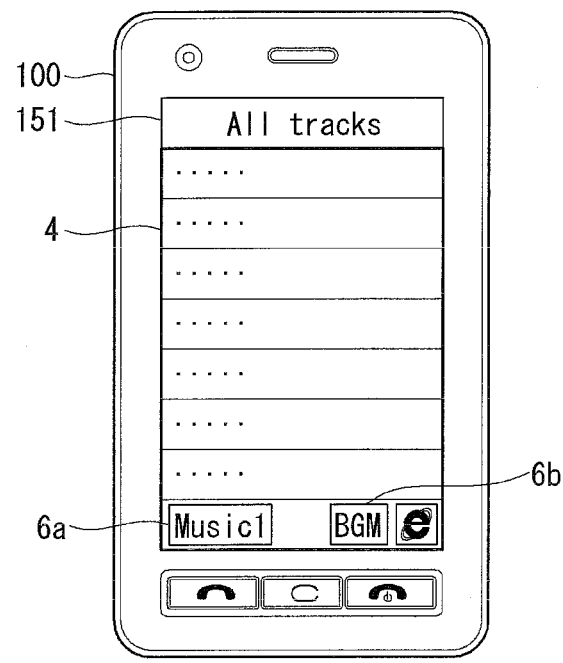
FIGS. 6A and 6B are diagrams showing an example in which a streaming content is added as a background music mode in the mobile terminal according to the first exemplary embodiment of this document.
Figure 6B:
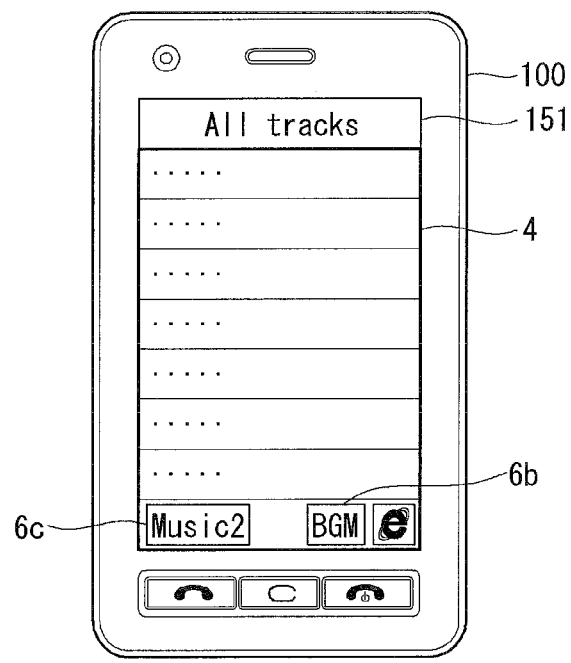

FIGS. 6A and 6B are diagrams showing an example in which a streaming content is added as a background music mode.

Referring to FIG. 6A, the controller 180 adds a streaming content 6a 'Music 1' to the content playlist 4 as a background music mode. An icon 6b indicates that the streaming content 6a has been added as the background music mode. Next, if the background music of a web page including the streaming content 6a is changed, the controller 180 acquires content information about a changed streaming content 6c 'Music 2' from the web page. A method of acquiring the content information about the changed streaming content 6c is the same as the method of acquiring content information, described with reference to FIGS. 4A to 4C. The controller 180 which has acquired the content information about the changed streaming content 6c updates the content playlist 4 by replacing the streaming content 6a 'Music 1' with the changed streaming content 6c 'Music 2', as shown in FIG. 6B. Meanwhile, when a user requests the play or update of the streaming content 6a in order to check whether the streaming content added as the background music mode has been changed, the controller 180 accesses the web page including the streaming content 6a and checks whether the background music of the web page has been changed. The controller 180 may check whether the background music has been changed by periodically accessing the web page including the streaming content 6a on the basis of path information about streaming content 6a.

Referring back to FIG. 2, the controller 180 determines whether the play of the corresponding streaming content in the content playlist has been requested, at step S104. If, as a result of the determination, the play of the corresponding streaming content is determined to have been requested, the controller 180 downloads the streaming content through the radio communication unit 110 and plays the downloaded streaming content. When the streaming content is downloaded, the controller 180 acquires detailed content information about the streaming content and stores the acquired information in the memory 160, at step S105. The controller 180 updates the content playlist on the basis of the content information, at step S106. That is, the controller 180 updates the information of the corresponding streaming content on the basis of the newly acquired detailed content information.

The controller 180 acquires simplified content information, such as an URL where the streaming content is placed and a content title, by parsing the web page in order to add the streaming content to the content playlist. The controller 180 adds the streaming content to the content playlist on the basis of the acquired information. Next, when the streaming content is downloaded and played in the mobile terminal 100, the controller 180 downloads the detailed content information of the streaming content together with streaming content data. For example, in case where the streaming content is an audio content, the controller 180 may acquire an ID3 tag, including information about an album name, a singer name, the text, a composer, and a songwriter, together with an audio file when the audio content is played. After the detailed content information is acquired, the controller 180 stores the detailed content information in the memory 160 and updates the information of the streaming content, included in the content playlist, on the basis of the detailed content information.

Figure 7A:
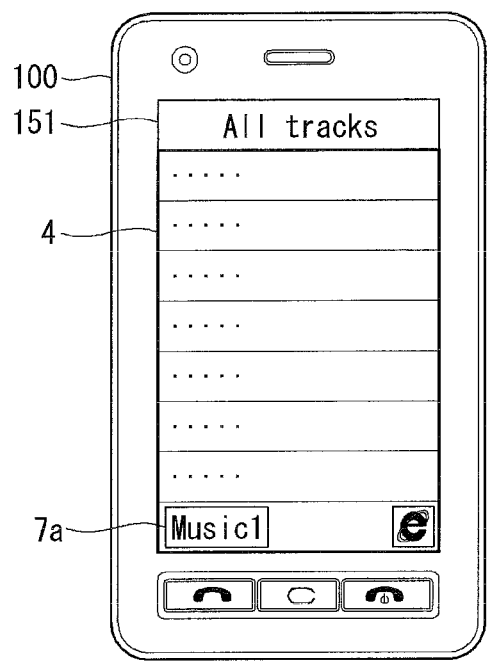
FIGS. 7A and 7B are diagrams showing an example in which the content playlist is updated when a streaming content is played in the mobile terminal according to the first exemplary embodiment of this document.
Figure 7B:
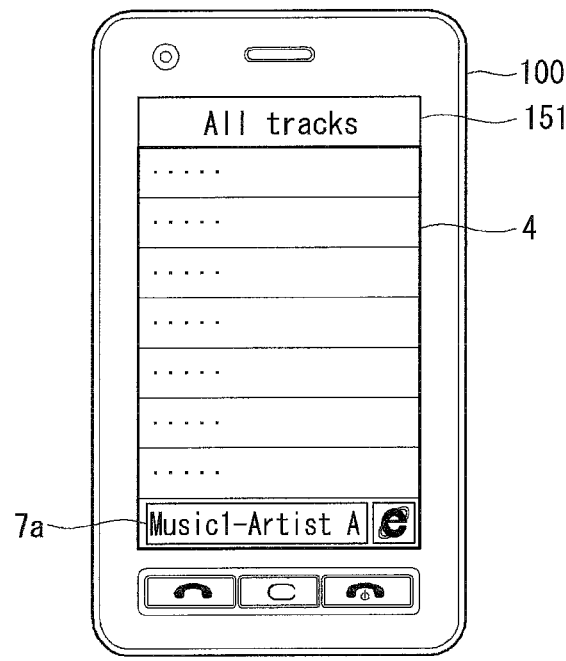

FIGS. 7A and 7B are diagrams showing an example in which the content playlist is updated when a streaming content is played.

Referring to FIG. 7A, when a streaming content 7a is first added to the content playlist 4, only the title Music 1 of the streaming content 7a is displayed in the content playlist 4. Next, when the streaming content 7a is played, the controller 180 acquires detailed content information including the singer name Artist A of the streaming content 7a. Next, the controller 180 updates information of the streaming content 7a, displayed in the content playlist 4, on the basis of the acquired detailed content information, as shown in FIG. 7B.

Figure 8:
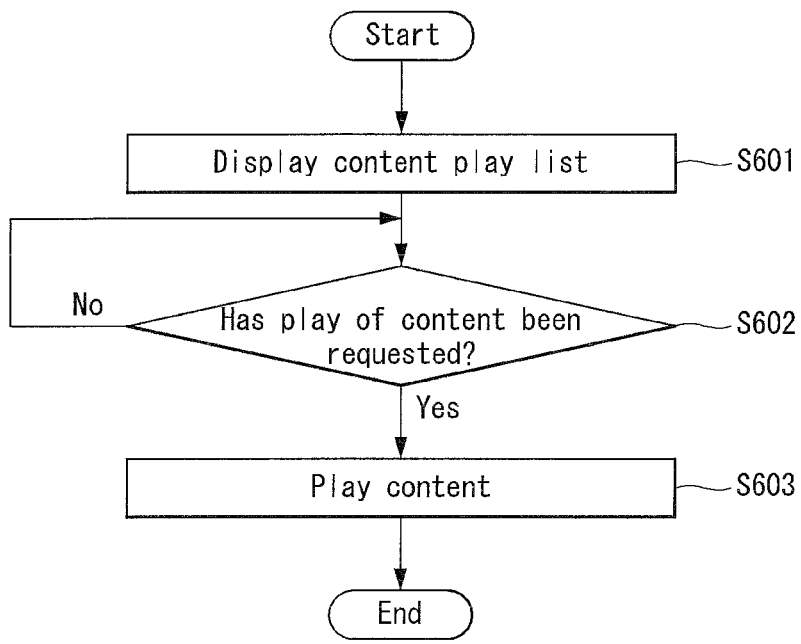
FIG. 8 is a flowchart illustrating a method of the mobile terminal playing a streaming content according to the first exemplary embodiment of this document.

FIG. 8 is a flowchart illustrating a method of the mobile terminal 100 playing a streaming content according to the first exemplary embodiment of this document. FIGS. 9 to 11 are diagrams illustrating the method of the mobile terminal 100 playing a streaming content.

Referring to FIG. 8, the controller 180 displays at least some of a content playlist, stored in the memory 160, on the screen of the mobile terminal 100 through the display unit 151, at step S601. The content playlist may comprise at least one content to which path information corresponding to a web address is mapped. That is, the content playlist may comprise at least one streaming content placed in a web page. The content playlist may further comprise contents to which path information corresponding to a location within the memory 160 is mapped. FIGS. 9 and 10 are diagrams showing an example in which the content playlist is displayed on a screen.

Figure 9A:
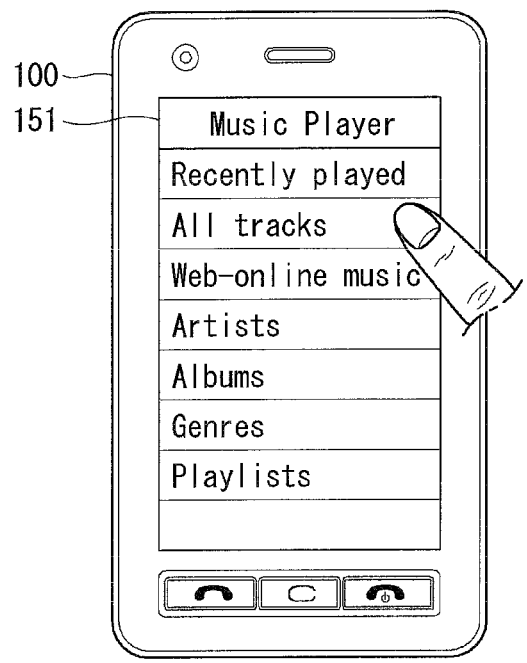
FIGS. 9A and 9B and FIGS. 10A and 10B are diagrams showing an example in which the content playlist is displayed on a screen in the mobile terminal according to the first exemplary embodiment of this document.
Figure 9B:
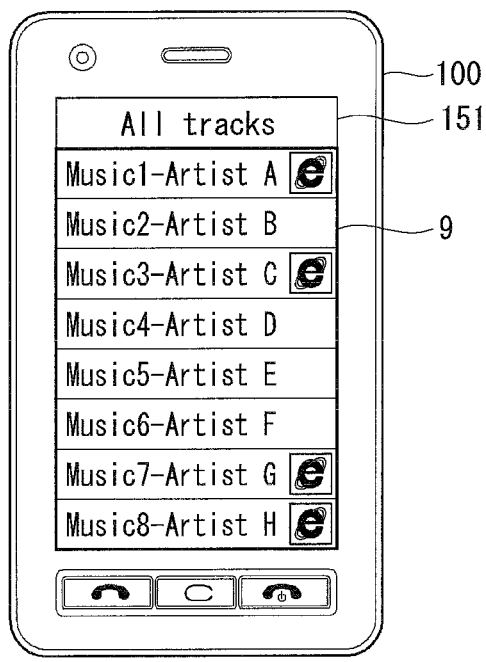

Referring to FIG. 9A, a user requests a list of all streaming contents, included the content playlist, through the user input unit 180. In response to the request, the controller 180 displays a list 9 of all streaming contents Music 1 to Music 8 included in the content playlist, as shown in FIG. 9B. That is, the controller 180 displays not only the streaming contents Music 2, Music 4, Music 5, and Music 6 included in the memory 160, but also the list 9 including the streaming contents Music 1, Music 3, Music 7, and Music 8 located in a corresponding web page.

Figure 10A:
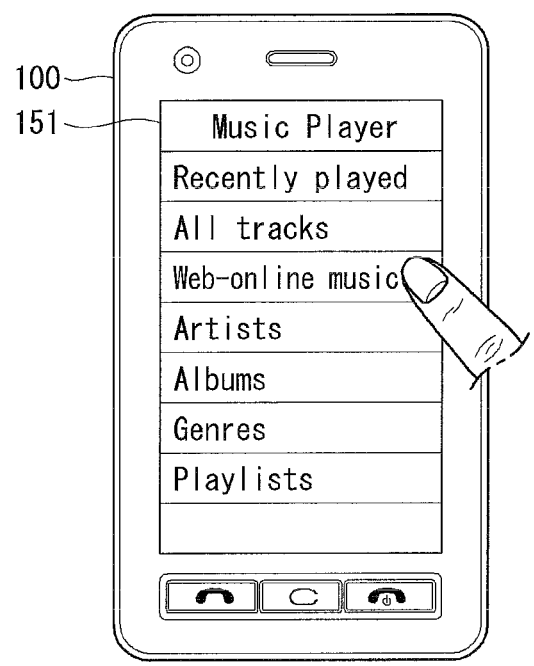
Figure 10B:
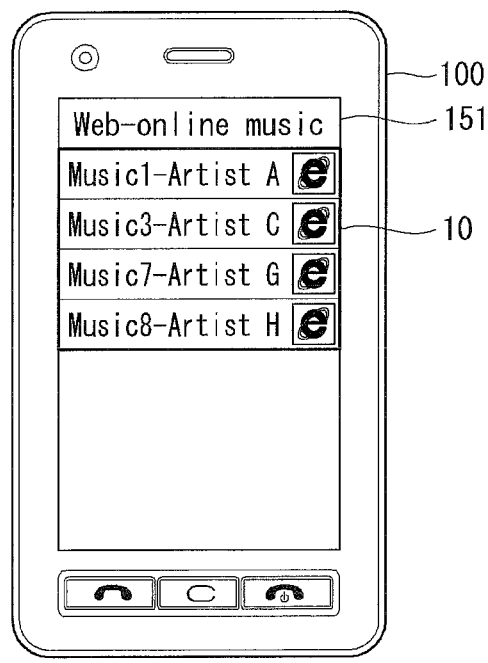

Referring to FIG. 10A, a user requests a list of some of streaming contents, included in the content playlist, through the user input unit 180. In response thereto, the controller 180 displays a list 10 of only the streaming contents Music 1, Music 3, Music 7, and Music 8 located in the web page, from among all the streaming contents included in the content playlist, on a screen, as shown in FIG. 10B.

Referring back to FIG. 8, the controller 180 determines whether the play of streaming contents selected from the content playlist has been requested, at step S602. If, as a result of the determination, the play of streaming contents selected from the content playlist is determined to have been requested, the controller 180 plays the selected streaming contents on the basis of path information mapped to the selected streaming contents, at step S603. For example, in case where the path information mapped to the selected streaming contents corresponds to a specific location within the memory 160, the controller 180 reads the corresponding streaming contents from the memory 160 and plays the read streaming contents. For example, in case where the path information mapped to the selected streaming contents corresponds to a web address, the controller 180 accesses a web page or a web server corresponding to the web address through the radio communication unit 110. Next, the controller 180 downloads the selected streaming contents from the web page or the web server and plays the downloaded streaming contents.

The controller 180 may display the web page where the played streaming contents are located on the screen of the mobile terminal 100 through the display unit 151.

Figure 11A:
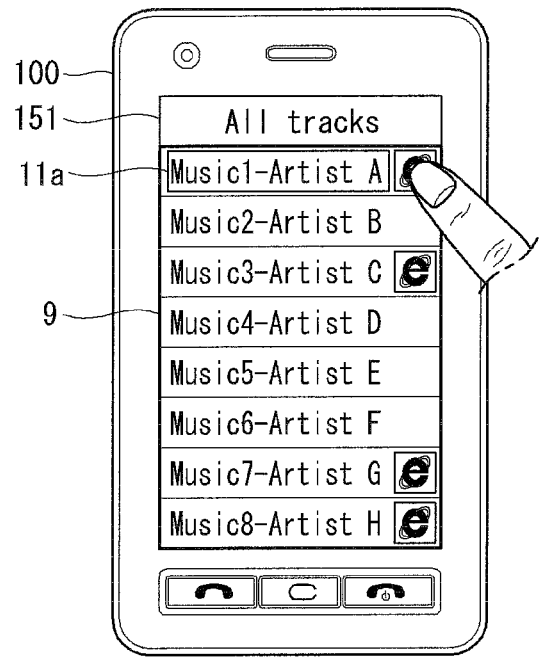
FIGS. 11A and 11B are diagrams showing an example in which contents included in the content playlist are played in the mobile terminal according to the first exemplary embodiment of this document.
Figure 11B:
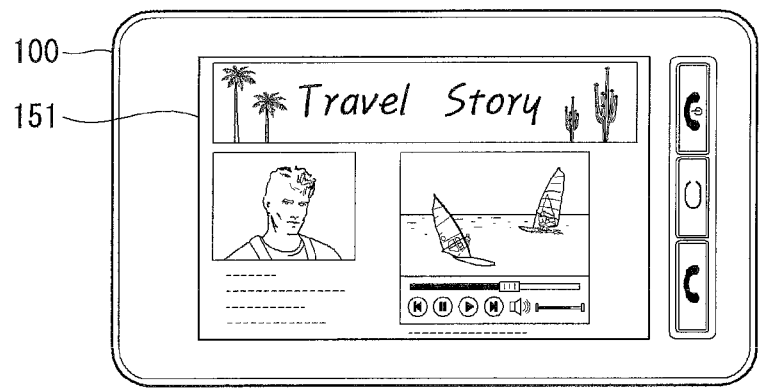

FIGS. 11A and 11B are diagrams showing an example in which contents included in the content playlist are played.

Referring to FIG. 11A, a user requests that a streaming content 11a selected from a content list 9 displayed on a screen should be played and a web page where the streaming content 11a is placed should be displayed. In response to the request, the controller 180 accesses the corresponding web page through the radio communication unit 110 on the basis of a web address mapped to the selected streaming content 11a. Next, the controller 180 displays the accessed web page on the screen of the mobile terminal 100, downloads the corresponding streaming content from the web page, and plays the downloaded streaming content, as shown in FIG. 11B. In case where the streaming content is an audio content, the streaming content may be played in the form of a background screen of the web page.

In accordance with the first exemplary embodiment of this document, the mobile terminal 100 can generate a content playlist including one or more streaming contents located in a web page. Accordingly, although a user does not play the streaming contents one by one, the streaming contents located in the web page can be played consecutively. Furthermore, a playlist, including not only contents included in the mobile terminal 100, but also streaming contents located in a web page, can be generated. Accordingly, the streaming content located in the web page and the contents stored in the mobile terminal 100 can be alternately played in the mobile terminal 100.

Hereinafter, a method of controlling the mobile terminal 100 according to a second exemplary embodiment of this document and the operations of the mobile terminal 100 for implementing the method are described in detail with reference to FIGS. 12 and 13.

Figure 12:
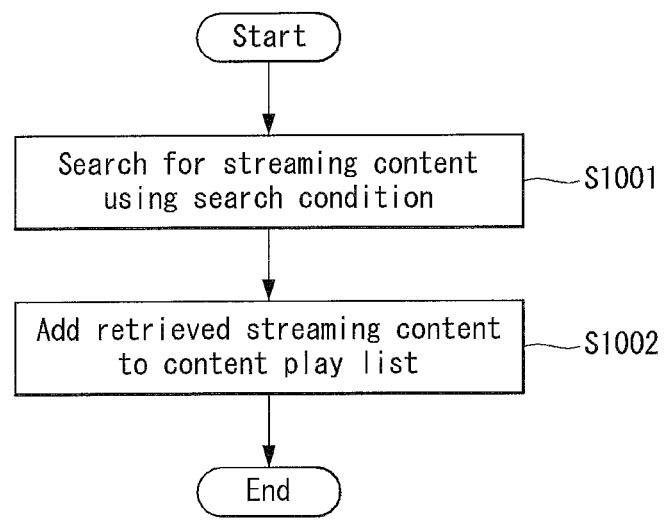
FIG. 12 is a flowchart illustrating a method of adding streaming contents to a content playlist in the mobile terminal according to a second exemplary embodiment of this document.

FIG. 12 is a flowchart illustrating the method of adding streaming contents to a content playlist in the mobile terminal 100 according to the second exemplary embodiment of this document. FIGS. 13A to 13C are diagrams illustrating the method of adding streaming contents to the content playlist in the mobile terminal 100 according to the second exemplary embodiment of this document.

Referring to FIG. 12, the controller 180 searches for streaming contents, included in web pages, using a search condition including keywords, at step S1001. For example, the controller 180 may collect web pages, including streaming contents corresponding to keywords, using web crawling or really simple syndication (RSS). The controller 180 acquires content information about the retrieved streaming contents from the web pages. For example, the controller 180 may input keywords to the search engine of a web site and acquire content information about streaming contents having a desired format from retrieved web pages.

The keywords used to search for the streaming contents may be inputted through the user input unit 130 or may be extracted by the controller 180. In the latter case, the controller 180 collects a user's content preference information on the basis of information collected when contents are played and stores the collected content preference information in the memory 160. Here, the content preference information may comprise the number of times that a content has been played, the frequency of the content played, a date that the content is recently played, a user rating for the content, and the like. Next, when a user makes a content addition request, the controller 180 extracts keywords, including a genre preferred by the user, an artist name, and so on, on the basis of content information about contents included in a content playlist and the user's content preference information about the play of the contents. Next, the controller 180 searches for streaming contents to be added to the content playlist on the basis of the extracted keywords.

FIGS. 13A to 13C are diagrams showing an example in which keywords are extracted.

As shown in FIG. 13A, the controller 180 stores content preference information, comprising a user rating for each of contents Music 1, Music 2, Music 3, and Music 4 and the number of times of play for each content, in the memory 160. Content information, including a title, an artist, and a genre for each content, is also stored in the memory 160. Meanwhile, as shown in FIG. 13B, the controller 180 extracts keywords AAA, BBB, CCC to HHH on the basis of the content information stored in the memory 160. Next, the controller 180 acquires marks for each of the keywords on the basis of the content preference information stored in the memory 160. Next, as shown in FIG. 13C, the controller 180 acquires last marks for the contents by applying weight to the acquired marks for the keyword. Next, the controller 180 searches for streaming contents, located in web pages, on the basis of keywords each having the last marks higher than a critical value, from among the keywords. For example, if the critical value is 0.3, the controller 180 searches for streaming contents using the keywords CCC, BBB, and FFF from among all the keywords AAA, BBB, CCC to HHH.

Referring back to FIG. 12, the controller 180 adds the streaming contents, retrieved, at step S1001, to the content playlist on the basis of content information about the retrieved streaming contents, at step S1002. Here, the controller 180 may display a list of the retrieved streaming contents on a screen through the display unit 151 and add only streaming contents, selected from the list through the user input unit 130, to the content playlist. The controller 180 may automatically add corresponding streaming contents to the content playlist on the basis of the content information about the retrieved streaming contents.

A method of the mobile terminal 100 playing streaming contents according to the second exemplary embodiment of this document is the same as the method of playing streaming contents according to the first exemplary embodiment of this document, described with reference to FIGS. 8 to 11, and a description thereof is omitted.

According to the second embodiment, the mobile terminal 100 searches for streaming contents by using keywords, inputted by a user, or keyword, extracted by analyzing a user's preference, and adds the retrieved streaming contents to a content playlist. Accordingly, a user does not need to search for and add a streaming content one by one in order to a desired streaming content to a content playlist.

The above-described control method of the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a radio communication interface;
a display for displaying multimedia content;
a storage device configured to store a content playlist; and
a controller configured to update the content playlist,
wherein the controller is configured to:
access a web page;
acquire content information corresponding to streaming content in the web page, wherein the content information including address information for accessing the web page for retrieving the streaming content;
add the streaming content to the content playlist stored in the storage device and display the streaming content and an icon indicating that an added content is for a streaming content in the content playlist based on the acquired content information on the display, wherein a URL (Uniform Resource Locator) of the web page is mapped to the icon, and wherein the playlist includes at least one content stored in the storage device, wherein the icon displayed in the content playlist is maintained after terminating accessing the web page;
receive an input requesting playing of the streaming content included in the content playlist;
stream the streaming content through the radio communication interface in response to the input and play the streamed streaming content;
acquire additional content information about the streaming content when the streaming content is downloaded, wherein the additional content information includes at least one of an artist, title, album, or genre information associated with the streaming content; and
update the content playlist to include the additional content information,
wherein the controller is further configured to:
add the streaming content to the content playlist as a background music mode,
acquire content information about a changed streaming content from the web page if a streaming content of the web page is changed,
update the content playlist by replacing the displayed streaming content with the changed streaming content, and
display an icon indicating that the streaming content has been added as a background music mode in the content playlist, if the added streaming content is a background music of the web page.

2. The mobile terminal of claim 1, wherein the controller acquires the content information by parsing the web page.

3. The mobile terminal of claim 1, wherein the controller generates a list of the streaming content included in the web page and adds the streaming content to the content playlist when the streaming content is selected from the displayed list.

4. The mobile terminal of claim 1, wherein the downloaded streaming content is stored in the storage device.

5. The mobile terminal of claim 1, wherein the downloaded streaming content is buffered to be streamed and discarded after playback.

6. The mobile terminal of claim 1, wherein the controller is configured to sequentially playback streaming content and the at least one content stored in the storage device based on the playlist.

7. The mobile terminal of claim 1, wherein the controller periodically accesses a web page associated with the streaming content included in the playlist to update the content information.

8. The mobile terminal of claim 1, wherein the controller controls a display to display the web page associated with the streaming content.

9. The mobile terminal of claim 1, wherein the at least one streaming content is one of a streaming audio, streaming video, or streaming multimedia content.

10. The mobile terminal of claim 1, wherein the controller is configured to generate one or more keywords based on content included in the playlist and to search a plurality of web sites for streaming content using the one or more keywords.

11. A method of controlling a mobile terminal, comprising:
  accessing a web page;
  acquiring content information corresponding to one streaming content on the web page, the content information including address information for accessing the web page for retrieving the streaming content;
  adding the streaming content to a content playlist stored in a storage device based on the acquired content information and displaying the streaming content and an icon indicating that an added content is for a streaming content in the content playlist based on the acquired content information on a display, wherein a URL (Uniform Resource Locator) of the web page is mapped to the icon, and wherein the playlist includes at least one content stored in the storage device, wherein the icon displayed in the content playlist is maintained after terminating accessing the web page;
  receiving a request to play the at least one streaming content;
  accessing the web page corresponding to the address information;
  streaming the streaming content from the web page and playing the streamed streaming content;
  acquiring additional content information about the streaming content when the streaming content is downloaded; and
  updating the content playlist based on the additional content information,
  wherein the method further comprising:
    adding the streaming content to the content playlist as a background music mode,
    acquiring content information about a changed streaming content from the web page if a streaming content of the web page is changed,
    updating the content playlist by replacing the displayed streaming content with the changed streaming content, and
    displaying an icon indicating that the streaming content has been added as a background music mode in the content playlist, if the added streaming content is a background music of the web page.

12. The mobile terminal of claim 1, wherein the controller controls the display to display the web page associated with the streaming content during playback.

13. The method of claim 11, further comprising:
  displaying the web page associated with the streaming content during playback on the display.

14. The mobile terminal of claim 1, if the back ground music of the web page is changed, wherein the controller is configured to acquire content information about a changed streaming content from the web page, update the content playlist by replacing the displayed streaming content with the changed streaming content.

* * * * *